United States Patent
Aliperta et al.

(10) Patent No.: US 11,007,676 B2
(45) Date of Patent: May 18, 2021

(54) PROCESS FOR THE PRODUCTION OF A SULFONE POLYMER AGGLOMERATE FROM THE RECOVERY OF EXPANDED SULFONE POLYMER

(71) Applicant: DIAB International AB, Laholm (SE)

(72) Inventors: Luigi Aliperta, Rivamonte Agordino (IT); Raffaela Bressan, Oderzo (IT); Stephen Leonard Jackson, Mesquite, TX (US); Robert Wayne Shelton, Carrollton, TX (US)

( * ) Notice: Subject to any disclaimer, the term of this patent is extended or adjusted under 35 U.S.C. 154(b) by 6 days.

(21) Appl. No.: 16/475,113

(22) PCT Filed: Jan. 18, 2018

(86) PCT No.: PCT/EP2018/051238
§ 371 (c)(1),
(2) Date: Jun. 30, 2019

(87) PCT Pub. No.: WO2018/137998
PCT Pub. Date: Aug. 2, 2018

(65) Prior Publication Data
US 2019/0366589 A1    Dec. 5, 2019

(30) Foreign Application Priority Data
Jan. 25, 2017   (IT) ................... 102017000007890

(51) Int. Cl.
| B29B 17/00 | (2006.01) |
| B29B 17/04 | (2006.01) |
| C08J 9/33 | (2006.01) |
| B29B 9/08 | (2006.01) |
| B01J 2/20 | (2006.01) |
| B29K 81/00 | (2006.01) |
| C08L 81/06 | (2006.01) |

(52) U.S. Cl.
CPC ............. *B29B 17/0026* (2013.01); *B01J 2/20* (2013.01); *B29B 9/08* (2013.01); *B29B 17/0412* (2013.01); *C08J 9/33* (2013.01); *C08L 81/06* (2013.01); *B29K 2081/06* (2013.01); *Y02W 30/62* (2015.05)

(58) Field of Classification Search
None
See application file for complete search history.

(56) References Cited

U.S. PATENT DOCUMENTS

| 3,790,422 | A | * | 2/1974 | Jourquin | .................... | C08J 9/33 |
| | | | | | | 264/126 |
| 5,009,586 | A | * | 4/1991 | Pallmann | .................. | B29B 9/06 |
| | | | | | | 264/142 |
| 5,114,331 | A | * | 5/1992 | Umehara | ................ | B29B 13/10 |
| | | | | | | 425/200 |
| 2003/0021991 | A1 | * | 1/2003 | Sugayoshi | .............. | C21B 5/026 |
| | | | | | | 428/372 |
| 2003/0181538 | A1 | * | 9/2003 | Martel | ................ | B29B 17/0404 |
| | | | | | | 521/50 |
| 2004/0167241 | A1 | * | 8/2004 | Scherzer | ............. | B29C 44/5654 |
| | | | | | | 521/79 |
| 2005/0179153 | A1 | * | 8/2005 | Riise | ........................ | B03C 7/00 |
| | | | | | | 264/40.1 |
| 2007/0243362 | A1 | * | 10/2007 | Gilbert | ................ | B29B 17/0042 |
| | | | | | | 428/195.1 |
| 2012/0273984 | A1 | | 11/2012 | Desbois | | |

FOREIGN PATENT DOCUMENTS

CN         104830049        8/2015

* cited by examiner

*Primary Examiner* — Mary Lynn F Theisen
(74) *Attorney, Agent, or Firm* — Themis Law

(57) ABSTRACT

A process for the production of a polymeric agglomerate obtained from expanded sulfone polymer recovered from extrusion or injection molding processes of sulfone polymer, the agglomeration of said expanded sulfone polymer being effected in said process. With respect to the known art for the production of expanded sulfone polymers that use starting virgin sulfone polymers, the present invention offers the advantage of providing a recovered expanded sulfone polymer which can be used as starting material together with the corresponding virgin sulfone polymer.

8 Claims, No Drawings

PROCESS FOR THE PRODUCTION OF A SULFONE POLYMER AGGLOMERATE FROM THE RECOVERY OF EXPANDED SULFONE POLYMER

The present invention relates to a process for the production of an agglomerate of expanded sulfone polymer, obtained from the processing recovery of said polymer.

The document US2012/0273984 discloses a process for recycling multiphase moldings comprising at least one foamed phase and at least one unfoamed phase produced via reaction injection molding, where the molding is first compressed, comminuted (ideally via grinding) and heated and then is processed in the plastified state to give a molding (F2).

The D(50) numerical value pf the particles produced via grinding is preferably <10 mm.

In one embodiment of the invention, the processing to give the molding (F2) takes place via injection molding, extrusion or compression molding, preferably extrusion.

The document CN 104830049 relates to the recycling of rigid foam waste material. The sheet is prepared from, by weight, 60-150 parts of isocyanate, 100 parts of a polyol compound, 0.1-2 parts of a catalyst, 1-5 parts of a foaming agent, and hard foam wastes accounting for 60-90% of the total mass of raw materials. The sheet has the advantages of high utilization rate of the hard foam wastes, low energy consumption in the production process, provision of a new way for repeated utilization of the hard foam wastes, energy and material saving, and no influences on environment.

The field of the invention relates to processings using a virgin sulfone polymer, for example for the production of articles based on expanded sulfone polymers obtained by extrusion or injection moulding. The products thus obtained can consist of expanded materials, for example foams used as core material in composites, sections, membranes and the like.

In this type of application, the use of a polymer of the group of sulfone polymers is preferred, as this material has thermal-, mechanical- and flame-resistance properties which are particularly desirable for the end-products.

The polymers of the group of polysulfones used for these applications are virgin, i.e. obtained directly from synthesis and have the following structural formula:

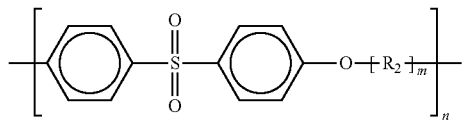

wherein:

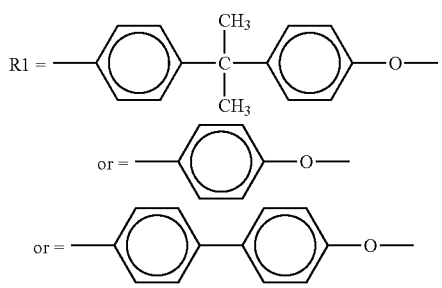

wherein
n=60-400
m=0.1

The polymers of the group of polysulfones to which the invention relates are characterized in particular by a glass transition temperature Tg of at least 180° C., as measured according to the standard DIN EN ISO 11357 with DSC, under the following conditions:
equilibrium at 0° C.
temperature rise at 20° C./min from 0 to 340° C.
isotherm at 340° C. for 5 minutes
cooling at 20° C./min from 340° C. to 0° C.
isotherm 5 minutes
temperature rise at 20° C./min from 0 to 340° C.

The Tg value is calculated as maximum flexion of the curve during the glass transition during the second temperature rise.

The above-mentioned polymers are also preferred due to their intrinsic viscosity value (IV) of at least 30 ml/g, as measured under the following conditions:
standard DIN EN ISO 1628-1
concentration analyzed from 0.008 to 0.013 g/ml
solvent phenol:tetrachloroethane (60:40)
Uhbbelold IC capillary
analysis temperature at 30° C.

The intrinsic viscosity IV is calculated as ml/g from straight-line regression of the viscosity, reduced in relation to the various concentrations to a concentration value equal to 0, as indicated under item 9.1 of the standard DIN EN ISO 1628-1.

The virgin polymers of the group of polysulfones described, however, have the disadvantage of being extremely costly materials. In addition, the processes in which they are used, at times involve the formation of considerable quantities of scraps which must be treated to avoid creating problems of environmental impact.

The main objective of the present invention is to provide a process suitable for allowing the recovery of foams or expanded sulfone polymer produced as waste from processes in which the raw material consists of virgin polymers of the group of polysulfones, so as to obtain a polymer of the group of polysulfones having Tg and IV values substantially comparable or very close to the Tg and IV values of analogous virgin polymers.

This and other objectives are achieved by means of the process described herein. Preferred embodiments of the invention are disclosed in the following description.

An object of the present invention is a process for the production of a polymeric agglomerate obtained from expanded sulfone polymer recovered from extrusion or injection moulding processes of sulfone polymer, which provides:

a grinding step of the recovered expanded polymer into particles having a size ranging from 0.1 to 10 mm, a drawing step through the holes of a die-plate wherein the grinded material, for a time of a fraction of a second and with a heating lower than the melting point of the sulfone polymer, is compacted into a dense granule forming the agglomeration of said expanded sulfone polymer.

The agglomeration process is such as to allow an increase in density from at least 30 Kg/m³ to at least 1000 Kg/m³ with a drawing time less than 5 seconds.

Said sulfone polymer is selected from polysulfone, polyethersulfone, polyphenylsulfone and polyetherethersulfone.

Said expanded sulfone polymer recovered from extrusion or injection moulding processes of sulfone polymer has:

a density of at least 30-300 Kg/m³
a Tg value equal to at least 224-228° C.
an IV value of at least 42-50 ml/g.

Said polymeric agglomerate has a Tg value equal to at least 180° C., an IV value of at least 30 ml/g and a density of at least 1000 Kg/m³.

In particular said TG temperature is comprised between 223° C. and 228° C. and said viscosity IV is comprised between 30 and 50 ml/g.

According to an embodiment, said polymeric agglomerate has:
a density of at least 1000 Kg/m³,
a Tg value equal to at least 223° C.,
an IV value of at least 30 ml/g.

With respect the known art for the production of expanded sulfone polymers that use starting virgin sulfone polymers, the present invention offers the advantage of providing a recovered expanded sulfone polymer which can be used as starting material together with the corresponding virgin sulfone polymer.

This result can be obtained as, thanks to the invention, the recovered polymer described has Tg and IV values very close to the analogous values of the corresponding virgin sulfone polymers.

According to the invention, the expanded product obtained from the processing of virgin sulfone polymer is treated in an agglomeration step, after the coarse grinding of the recovered expanded polymer into particles having a size ranging from 0.1 to 10 mm.

In the above-mentioned agglomeration step, the grinded product obtained in the previous grinding step, is subjected to a drawing step through the holes of a die-plate wherein the grinded material, for a time of a fraction of a second and with a heating lower than the melting point of the sulfone polymer, is compacted into a dense granule which forms an agglomerate.

In particular, in the agglomeration step described, the grinded product obtained in the previous step is fed to an agglomeration chamber by means of a dosage screw. The heating by friction and high pressure created by forcing the grinded material to pass through the holes of the die-plate, cause the agglomeration of the expanded polymeric material.

The temperature of the agglomeration process is below the melting point of the grinded polymer and the residence time of the same polymer in the agglomeration chamber is only a fraction of a second, these process conditions are such as to minimize the degradation of the sulfone polymer.

The polymeric material that passes through the holes of the die-plate is then cut with rotating knives and is sent by the cooling air into a granulator.

An example of the equipment that can be used in the process of the invention is described in the publications U.S. Pat. Nos. 7,335,008B2 and 7,927,388B2, but it is to be understood that the process of the invention is in no way limited to this type of equipment. Different types of systems can in fact be used, provided they are compatible with the formation of an agglomerate, starting from expanded sulfone polymer.

Viscosity analyses with a capillary tube, according to the standard DIN EN ISO 1628-1 indicated above, show that the material obtained from the agglomeration process of the recovery of expanded sulfone material has intrinsic viscosity IV and glass transition temperature Tg values very close to the analogous values of the corresponding starting virgin sulfone polymer. In this way, the recovered polymer described can be effectively used in processes for obtaining expanded sulfone polymers from a virgin-type starting polymer. In particular, the above-mentioned values relating to the agglomerate obtained with the process of the invention are IV higher than or equal to 30 ml/g and Tg higher than or equal to 180° C. The same agglomerate also has a density of at least 1,000 Kg/m³.

According to an example of the invention starting from a foam or from an expanded polymer obtained from virgin polyethersulfone with IV=43.4 ml/g and Tg=227.1° C., a corresponding recovered polyethersulfone is obtained with the process of the invention, having IV=30-50 ml/g and Tg=223-228° C., in particular IV=41.3 ml/g and Tg=225.8° C.

According to the present invention it is therefore possible, starting from a grinded material, to obtain an agglomerate having characteristics similar to the starting virgin polymer, thanks to the fact that said process provides for a reduced time and temperature exposure which avoids the degradation of the expanded sulfone polymer recovered, as it is not melted as in extrusion and injection or molding processes.

Modifications can be made to the invention as described above for creating variants which, however, are included in the scope of the following claims. Sulfone polymers selected from polysulfone, polyethersulfone, polyphenylsulfone and polyether-ethersulfone, are, for example, suitable for the invention.

The invention claimed is:

1. A process for production of a polymeric agglomerate obtained from an expanded sulfone polymer product recovered from extrusion or injection molding processes of a sulfone polymer, comprising:
grinding the recovered expanded polymer product into a ground material made of particles having a size ranging from 0.1 to 10 mm; and
drawing the recovered expanded polymer product through holes of a die-plate,
wherein the ground material, for a time of a fraction of a second and with a heating lower than a melting point of the sulfone polymer, is compacted into a dense granule forming an agglomeration of said expanded sulfone polymer to produce an aggregated polymer product, with an increase in density from at least 30 Kg/m³ to at least 1000 Kg/m³ with a drawing time less than 5 seconds.

2. The process according to claim 1, wherein said sulfone polymer is selected from the group consisting of polysulfone, polyethersulfone, polyphenylsulfone, and polyetherethersulfone.

3. The process according to claim 1, wherein a polymer obtained in said forming of the agglomeration has the following structural formula:

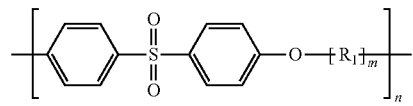

wherein:

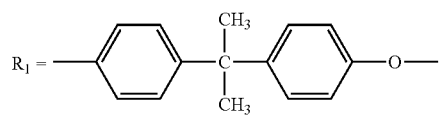

-continued

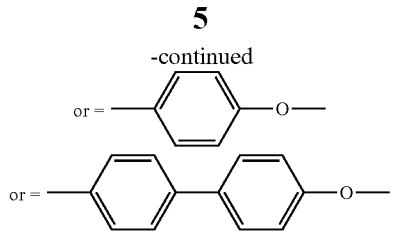

wherein n=60-400 and m=0.1.

4. The process according to claim 1, wherein said expanded sulfone polymer recovered from the extrusion or injection molding processes of the sulfone polymer has:
   a density of at least 30-300 Kg/m$^3$,
   a Tg value equal to at least 224-228° C., and
   an IV value of at least 42-50 ml/g.

5. The process according to claim 1, wherein said agglomerated polymer product has a Tg value equal to at least 180° C., an IV value of at least 30 ml/g, and a density of at least 1,000 Kg/m$^3$.

6. The process according to claim 5, wherein said Tg value ranges from 223 to 228° C. and that said IV value ranges from 30 to 50 ml/g.

7. The process according to claim 1, wherein said polymeric agglomerate has:
   a density of at least 1000 Kg/m$^3$,
   a Tg value equal to at least 223° C., and
   an IV value of at least 30 ml/g.

8. An agglomerated product from expanded sulfone polymer, produced with a process comprising:
   grinding a recovered expanded sulfone polymer product into a ground material made of particles having a size ranging from 0.1 to 10 mm; and
   drawing the recovered expanded polymer product through holes of a die-plate,
   wherein the ground material, for a time of a fraction of a second and with a heating lower than a melting point of the sulfone polymer, is compacted into a dense granule forming an agglomeration of said expanded sulfone polymer to produce an aggregated polymer product, with an increase in density from at least 30 Kg/m$^3$ to at least 1000 Kg/m$^3$ with a drawing time less than 5 seconds.

* * * * *